United States Patent [19]
Kober

[11] Patent Number: 5,628,437
[45] Date of Patent: May 13, 1997

[54] COMBINATION BACKPACK AND SEAT

[76] Inventor: Edward F. Kober, 12003 Church Rd., Richmond, Va. 23233

[21] Appl. No.: 663,930
[22] Filed: Jun. 14, 1996
[51] Int. Cl.⁶ ........................................ A45F 4/02
[52] U.S. Cl. .................. 224/155; 224/153; 224/575; 182/20; 182/187; 297/129
[58] Field of Search ....................... 224/153, 155, 224/575, 578, 579; 182/20, 187; 297/129

[56] References Cited

U.S. PATENT DOCUMENTS

| | | | |
|---|---|---|---|
| 3,927,733 | 12/1975 | Wurn et al. | 182/187 |
| 4,148,376 | 4/1979 | Campbell, Jr. | 182/20 |
| 4,387,924 | 6/1983 | Fernandez | 224/155 |
| 4,582,165 | 4/1986 | Latini | 182/20 |
| 4,773,574 | 9/1988 | Burgard | 224/155 |
| 4,938,400 | 7/1990 | Springston | 224/155 |
| 4,989,766 | 2/1991 | Lewallyn et al. | 224/155 |
| 5,303,975 | 4/1994 | Asato | 297/129 |
| 5,381,941 | 1/1995 | Brune | 224/155 |
| 5,445,301 | 8/1995 | Biedenharn, Jr. | 224/155 |

FOREIGN PATENT DOCUMENTS

| | | | |
|---|---|---|---|
| 58080 | 6/1937 | Norway | 224/155 |

*Primary Examiner*—Henry J. Recla
*Assistant Examiner*—Kam R. Shah
*Attorney, Agent, or Firm*—Norman B. Rainer

[57] ABSTRACT

A combination backpack and seat device is constructed of first and second U-shaped frame members, each having a transverse portion intended to be horizontally disposed during use and parallel side portions intended to be vertically disposed during use. The frame members are pivotably interconnected at a site within their side portions. A fabric panel extends between the transverse portions of the frame members and serves as a seat when the frame members are pivoted to maximum separation, representing the seat mode of use of the device. In the seat mode of use, the lower extremities of the side portions of the second frame member contact the ground, and a strap of adjustable length secured to the side portions of the second frame member is caused to tautly embrace a tree adjacent the ground. A pouch-like enclosure having an openable top portion is attached to the transverse portion of the first frame member, and is pendently supported by the transverse portion and positioned beneath the user's knees in the seat mode of use. The frame members can be pivoted to a nested coplanar configuration which represents a backpack mode of use.

13 Claims, 3 Drawing Sheets

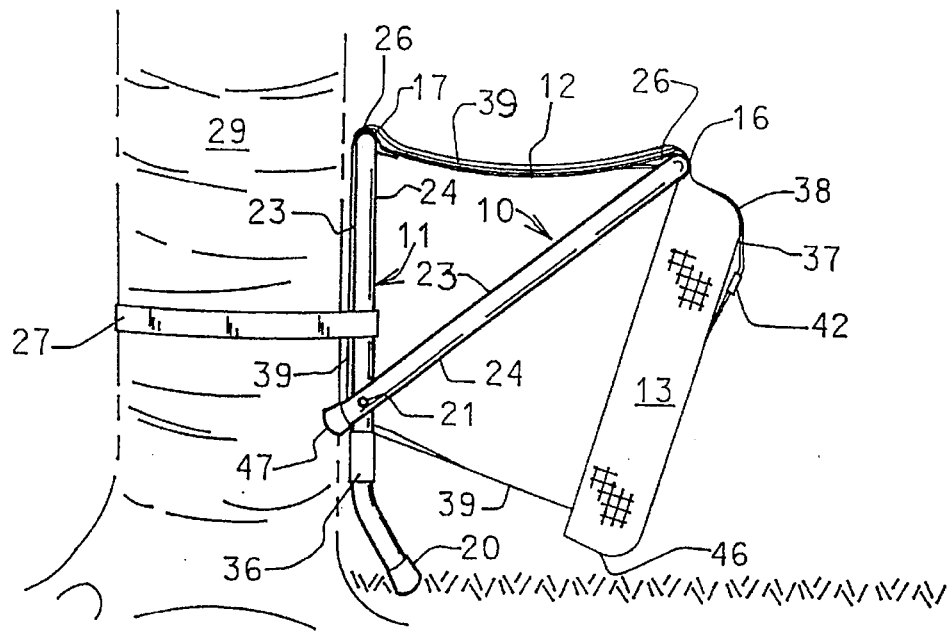
FIG. 3
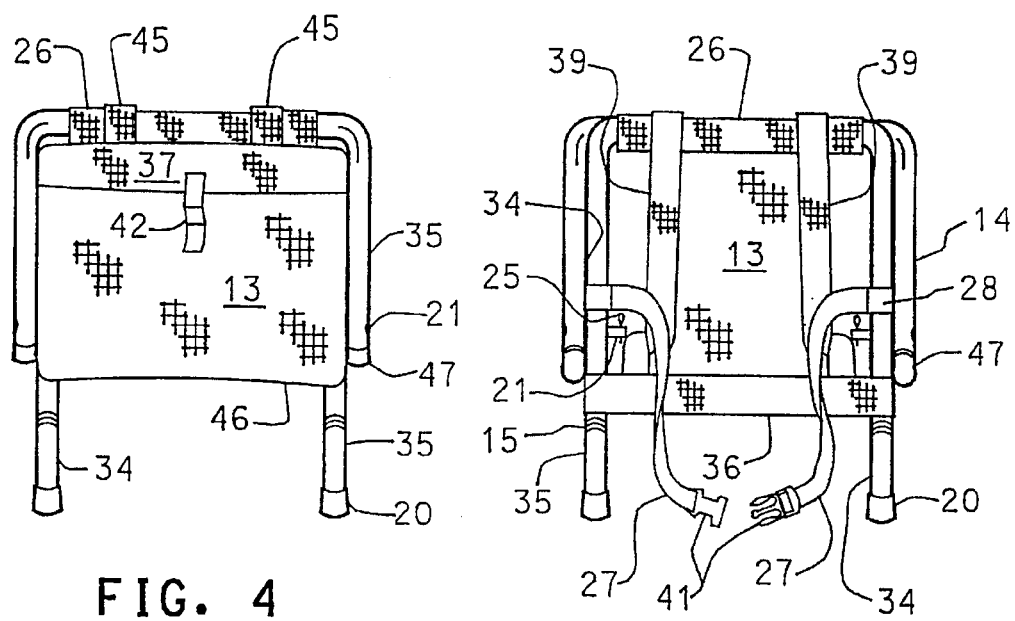
FIG. 4
FIG. 5

COMBINATION BACKPACK AND SEAT

BACKGROUND OF THE INVENTION

1. Field of the Invention

This invention relates to backpacking devices and more particularly to a backpacking device which can be used as a tree-supported seat.

2. Description of the Prior Art

Sportsman, hunters, photographers and other wilderness and wild life enthusiasts, in order to hunt or observe indigenous wildlife, often must remain relatively motionless for extended periods of time while waiting for game to appear, especially where there is no ready means of concealment, and the relative immobility serves as the only form of concealment available. It can be extremely uncomfortable and tiring for the hunter or the like to stand still for an extended period, and equally uncomfortable to sit or lie on damp or cold ground. As a consequence, various types of tree seats have been employed by outdoorsmen to alleviate, at least to some extent, the discomfort and fatigue.

Tree seats for use by hunters generally comprise a platform adapted to support the person seated thereon, and which is attached to a tree trunk to hold the seat in place in its operative position. The means by which the seat or platform is attached to the tree trunk is generally a tether of adjustable length such as a chain or rope, which is attached to the platform and is wrapped around the tree trunk.

It is almost always the case that the desired location for the hunter to take station is sufficiently far from civilization or any roads to require considerable walking or hiking to get to it. The hunter or outdoorsman will therefore want to carry food, water and other supplies and equipment which may be desirable or necessary for comfort, safety, survival and success of the particular mission. Such supplies are usually carried in a hiker's backpack.

Backpack devices which also serve as free-standing seating means are disclosed in U.S. Pat. No. 4,938,400 of Springston; U.S. Pat. No. 5,303,975 of Asato; and U.S. Pat. No. 5,445,301 of Biedenharn. The devices of Springston and Biedenharn are understandably of relatively heavy weight because of the structural elements required of a free-standing seat to support the user. The device of Asato, although of light-weight construction, disposes the backpack behind the seated user. In such manner of backpack disposition, needed supplies such as ammunition, binoculars, game-call device, photographic supplies, insect repellant, handgun, food, water, etc., are relatively inaccessible without considerable movement.

Backpack devices which also serve as tree-supported seating means are disclosed in U.S. Pat. No. 4,148,376 of Campbell; U.S. Pat. No. 4,582,165 of Latini; U.S. Pat. No. 4,989,766 of Lewallyn et. al.; and U.S. Pat. No. 5,381,941 of Brune. One common disadvantageous feature of such devices is that adequate leg clearance between the seating panel and the ground is achieved by virtue of proper placement of the securing means which attach the device to the tree. After long periods of time, sagging or slippage of the device diminishes said leg clearance unless the non-slip provisions of Lewallyn et. al. are employed, which increase the weight of the device. Another shortcoming of said tree-supported seat devices is that the backpack component must generally be removed before deploying the device as a seat.

Inasmuch as the art is relatively crowded with respect to these various types of combination packs and seats, it can be appreciated that there is a continuing need for and interest in improvements to such combination packs and seats, and in this respect, the present invention addresses this need and interest.

It is accordingly an object of the present invention to provide an improved combination of a backpack and tree-supported seat.

It is a further object of this invention to provide a combination as in the foregoing object wherein the backpack remains associated with said combination and readily accessible to the user in the seat mode of use of the combination.

It is another object of the present invention to provide a combination of the aforesaid nature which affords to the user in the seated position adequate leg clearance height above ground level.

It is a still further object of this invention to provide a combination of the aforesaid nature of light weight and simple, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a device comprising a combination of a backpack and a tree-supportable seat, said combination comprising:

a) first and second U-shaped frame members of monolithic construction comprised of a transverse portion and straight parallel side portions having lower extremities and upper extremities that merge with said transverse portion, said second frame member being disposed within said first frame member in a manner disposing said respective side and transverse portions in parallel relationship, and joined to said first frame member by pivot means interactive with the side portions of said first frame member adjacent the lower extremities thereof and with the side portions of said second frame member at a site substantially mid-length of said side portions between said upper and lower extremities, b) a fabric seating panel extending in joinder between the transverse portions of said frame members, and serving to limit the extent of separation of said transverse portions in movement about said pivot means, c) tree-engaging strap means of adjustable length extending in joinder between the side portions of said second frame member above said pivot means, d) an anchoring strap extending in joinder between the side portions of said second frame member below said pivot means, e) a pouch-like enclosure having an openable top extremity, and attached to the transverse portion of said first frame member, and a bottom extremity secured by said anchoring strap, and f) paired shoulder straps of adjustable length extending between the top and bottom extremities of said enclosure, thereby forming closed loops in parallel disposition to said side portions and encompassing the transverse portions of said first and second frame members.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is a side view of the embodiment of FIG. 2.

FIG. 4 is a rear view of the embodiment of FIG. 2.

FIG. 5 is a front view of the embodiment of FIG. 2.

DESCRIPTION OF THE PREFERRED EMBODIMENT

Figure 1:
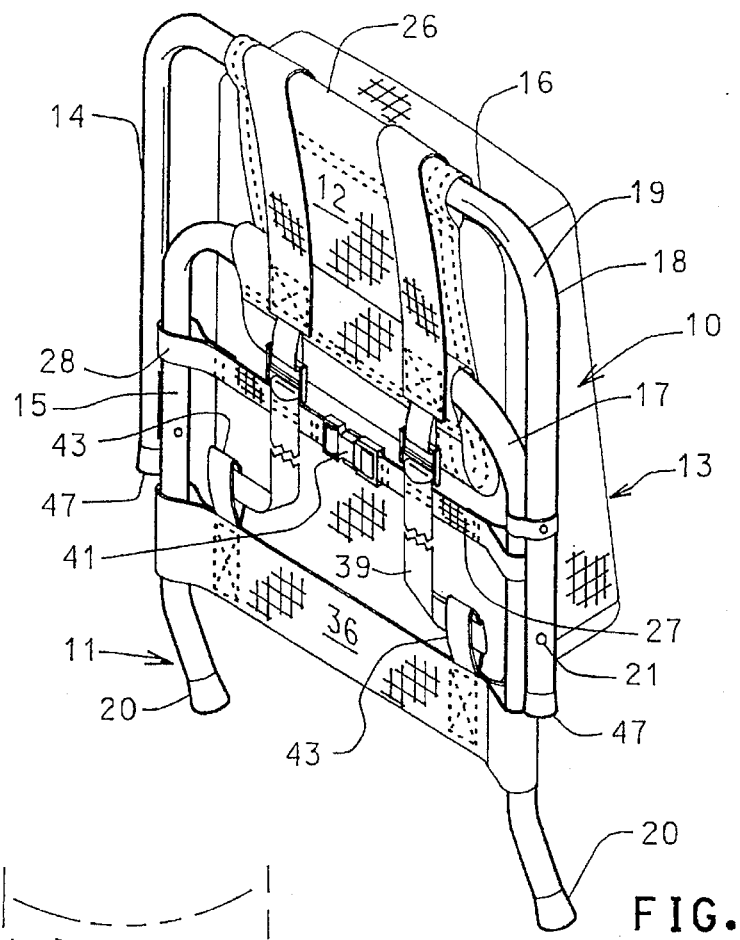
FIG. 1 is a perspective front and top view of an embodiment of the backpack/seat combination device of the present invention shown in its folded, backpack mode of use.

Referring now to FIGS. 1–5, an embodiment of the combination backpack/seat device of the present invention is shown comprised of first and second U-shaped frame members 10 and 11, respectfully, joined by fabric seating panel 12, and pouch-like enclosure 13 associated with first frame member 10.

Frame members 10 and 11 are of strong, rigid lightweight construction, preferably fabricated of a tubular metal such as steel, aluminum, magnesium, or titanium, or fabricated of tubular engineering grade plastic such as polyamide or polyester resin reinforced with a fibrous material such as graphite. Frame members 10 and 11 are each formed from a single piece of tube stock, having been bent into a U-shape having straight parallel side portions 14 and 15, respectively, and transverse portions 16 and 17, respectively. Said side portions have upper extremities 18 that merge in an arcuate corner region 19 with said transverse portion. The side portions of first frame member 10 have lower extremities 47, and the side portions of second frame member 11 have lower extremities 20. Said side portions may also be characterized in having facing interior surfaces 34 and exterior surfaces 35.

Second frame member 11 is nested within said first frame member in a manner disposing said respective side and transverse portions in parallel relationship and with interior surfaces 34 of said first frame members in close adjacency to the exterior surfaces 35 of said second frame member. Said frame members are pivotably interconnected in said nested relationship by pivot means in the form of pins 21 which penetrate the side portions of both frame members. The site of penetration of the side portions 14 of said first frame member by pins 21 is adjacent lower extremities 47 of the side portions of said first frame member. The site of penetration of the side portions 15 of said second frame member by pins 21 is substantially mid-length of said side portions, measured between said upper and lower extremities. In said interconnected relationship, the lower extremities 47 of said first frame member are disposed at an elevation above lower extremities 20 of said second frame member. Pivot pins 21 may be releasably secured by cotter pins 25, thereby enabling the combination to be dismantled to a more compact state for storage when not in use.

Retaining means in the form of band 22 may be utilized to maintain said frame members in nested coplanar relationship, as shown in FIG. 1. Said coplanar position of the frame members represents the travelling or backpack mode of use of the device of this invention, as will be shown hereinafter. The frame members may also be characterized as having front and rear perimeters 23 and 24, respectfully. In the embodiment of FIG. 1, the side portions 15 of said second frame member are shown to be bent rearwardly adjacent lower extremities 20.

Figure 2:
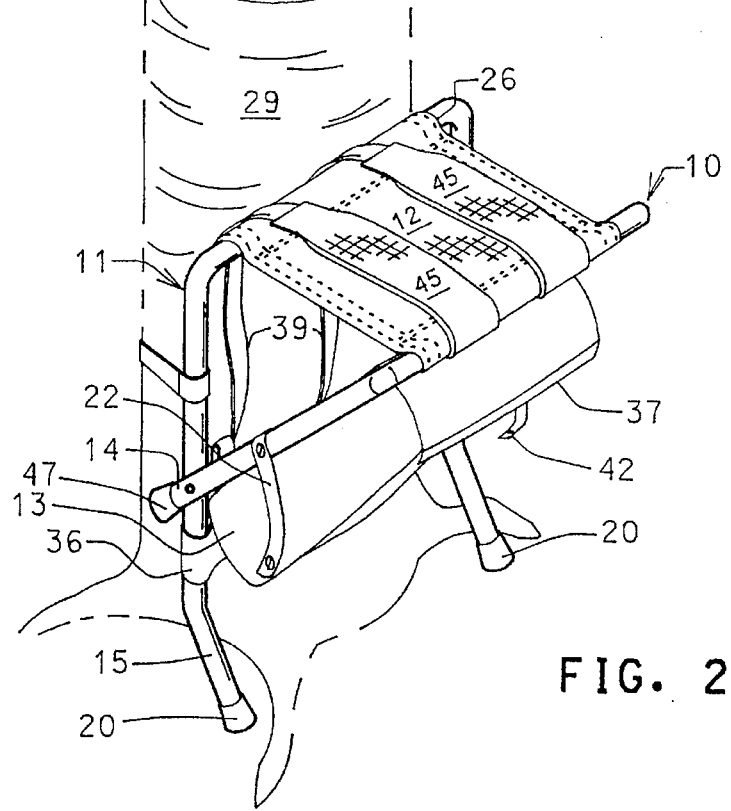
FIG. 2 is a perspective rear and top view of the device of FIG. 1 shown in its unfolded, seat mode of use.

Fabric seating panel 12 extends in joinder between the transverse portions of said frame members. The manner of joinder is by way of sewn loops 26 that embrace the transverse portions. Panel 12 serves to limit the extent of separation of said transverse portions in movement about pivot pins 21. When said transverse portions are at maximum separation, the device is in its seat mode of use, as shown in FIGS. 2 and 3 wherein panel 12 serves as the seat.

Tree-engaging strap 27 of adjustable length extends in joinder between the side portions 15 of said second frame member above pivot pins 21. Said joinder is by way of sewn loops 28 that embrace said side portions. Strap 27, which may be provided with a snap-locking plastic buckle 41, is adapted to extend forwardly from said second member and tightly encircle a tree trunk 29 adjacent ground level when the apparatus is utilized in its seating mode of use. In such manner of application, strap 27 serves to stabilize said second frame member in an upright position with its lower extremities 20 resting upon the ground. In said disposition, the device is not only secured as a seating means, but the side portions 15 of said second frame member provide positive displacement of panel 12 above ground level, thereby assuring leg clearance space for the user.

Figure 6:
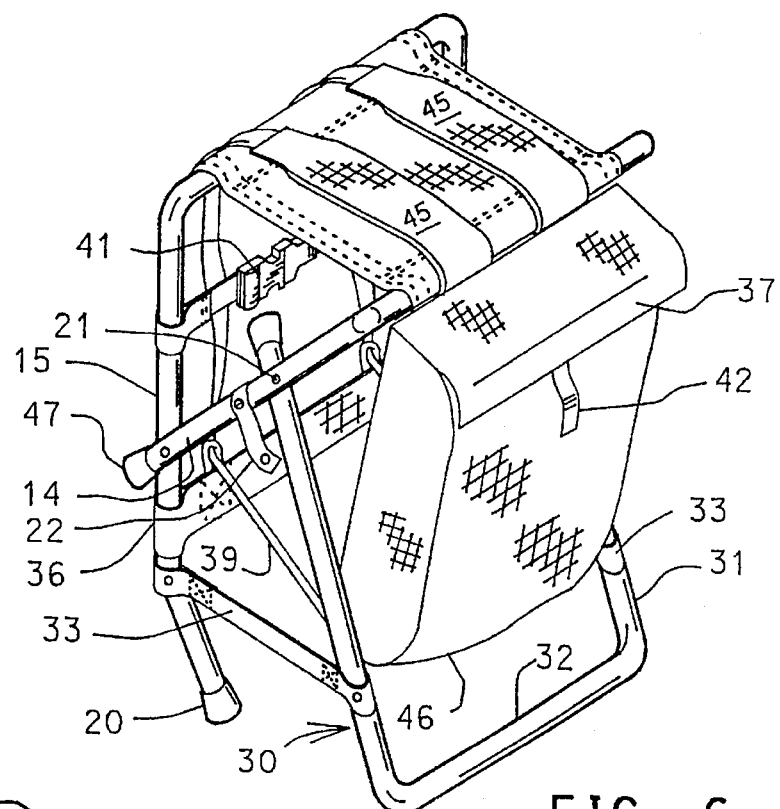
FIG. 6 is a perspective rear and top view of an alternative embodiment of the device of this invention shown in its unfolded, seat mode of use.

In the alternative embodiment shown in FIG. 6, a third U-shaped frame member 30 is employed to provide further support of the device in the unfolded or seat mode of use. Frame member 30 comprised of side portions 31 and lower transverse member 32, is pivotably secured to the side portions 14 of first frame member 10. Lower transverse member 32 is adapted to rest upon the ground in the seating mode of use in coplanar disposition with the lower extremities 20 of said second frame member. Limiting means in the form of paired straps 33 extend between side portions 31 and 15 for the purpose of limiting the extent of pivoted rearward movement of transverse member 32 in the seat mode of deployment of the apparatus. The limiting means may alternatively be comprised of two pivotably interactive flat bars which interlock in the fully extended position of transverse member 32 to form a rigid support structure.

Figure 7:
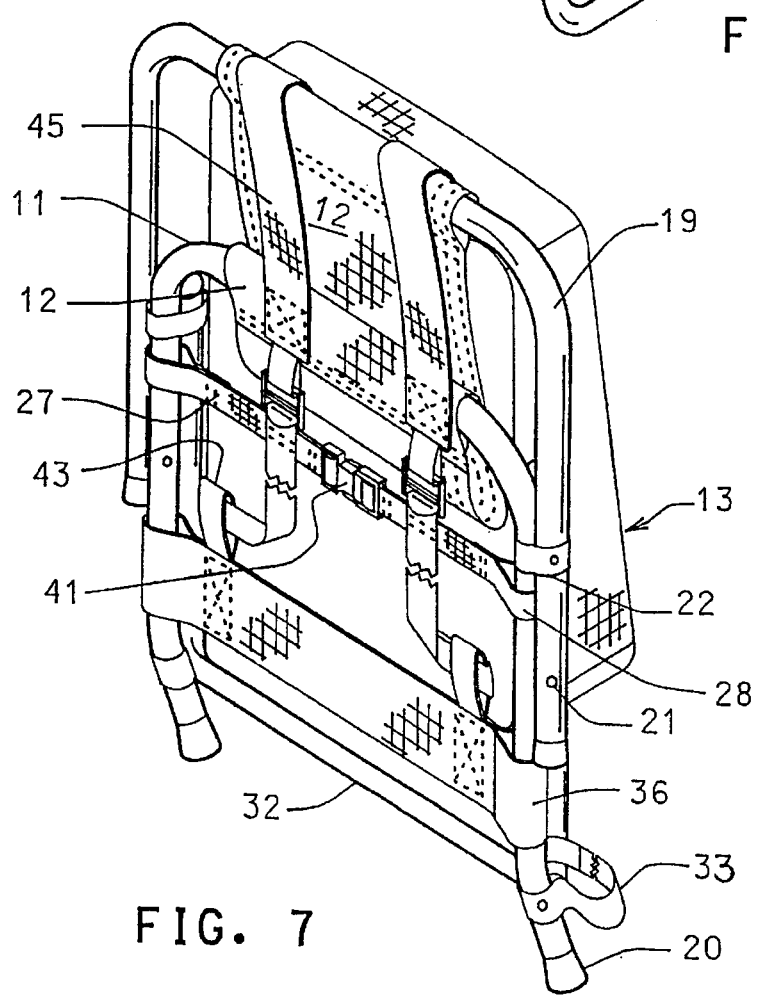
FIG. 7 is a perspective front and top view of the embodiment of FIG. 6 in its folded, backpack mode of use.

When not deployed in the seat mode of use, frame member 30 may be moved forwardly and collapsed into a flattened assembly as shown in FIG. 7 wherein frame member 30 abuts against frame member 11. It is to be noted that the compactness of the device of FIG. 7 in the folded, backpack mode is enhanced because frame member 30 is attached to the interior surfaces 34 of side portions 14.

An anchoring strap 36 extends in joinder between the side portions 15 of said second frame member below pivot pins 21.

A pouch-like enclosure 13 having an openable top extremity 38 equipped with closure flap 37 and buckle 42 is disposed upon the rear perimeter of said first frame member and attached to transverse portion 16. The bottom extremity 46 of enclosure 13 is located at an elevation preferably between the lower extremities 47 and 20 of said first and second frame members, respectively, when the device is in its folded state. Said enclosure may be attached in a removable manner to said first frame member, thereby permitting utility of the enclosure separate from the combination device.

Paired shoulder straps 39 of adjustable length extend between the top and bottom extremities of said enclosure, thereby forming closed loops in parallel disposition to said side portions while encompassing the transverse portions of said first and second frame members. The shoulder straps are preferably provided with a layer of padding 45 in places to provide comfort to the user. In the exemplified embodiment, straps 39 engage retainer loops 43 sewn to the anchoring strap 36 in a manner to adjustably secure enclosure 13. When said shoulder strap loops are enlarged, the bottom extremity 46 of enclosure 13 is able to swing rearwardly away from said first frame member, causing the enclosure to be pendently supported by transverse portion 16, as shown in FIGS. 3 and 6.

In view of the aforesaid components of the combination device of this invention and their specialized interaction, it is seen that, when said frame members are folded to their substantially coplanar state, the device may be worn as a backpack wherein the forward perimeters of the frames are directed toward the user's back. In the unfolded or seat mode, the device may be secured in upright position to the base of a tree trunk and used as a seat which affords comfortable clearance for the user's legs and also positions the top of the enclosure in a conveniently accessible manner.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A backpacking device which combines the features of a backpack with a tree-supportable seat, said device comprising:
   a) first and second U-shaped frame members of monolithic construction, each comprised of a transverse portion and parallel side portions having lower extremities and upper extremities that merge with said transverse portion, said second frame member being disposed partially within said first frame member in a manner disposing said respective side and transverse portions in parallel relationship, and joined to said first frame member by pivot means interactive with the side portions of said first and second frame members,
   b) a fabric seating panel extending in joinder between the transverse portions of said frame members, and serving to limit the extent of separation of said transverse portions in movement about said pivot means,
   c) tree-engaging strap means of adjustable length extending in joinder between the side portions of said second frame member above said pivot means,
   d) an anchoring strap extending in joinder between the side portions of said second frame member below said pivot means,
   e) a pouch-like enclosure attached to the transverse portion of said first frame member, and having an openable top extremity and closed bottom extremity, and
   f) a pair of shoulder straps of adjustable length extending between the top and bottom extremities of said enclosure, thereby forming closed loops in parallel disposition to said side portions and encompassing the transverse portions of said first and second frame members.

2. The device of claim 1 wherein said pivot means is interactive with said frame members at a site adjacent the lower extremities of the side portions of said first frame member and substantially mid-length of the side portions of the side members of said second frame member.

3. The device of claim 2 wherein said shoulder straps are slidably retained by said anchoring strap.

4. The device of claim 3 further provided with releasible retaining means for maintaining said frame members in a nested coplanar relationship representing a backpack mode of use of the device.

5. The device of claim 3 constructed in a manner whereby a seat mode of use is produced when said transverse portions are at their maximum extent of pivoted separation permitted by said seating panel.

6. The device of claim 5 further comprising a third U-shaped frame member pivotably secured to the side portions of said first frame member.

7. The device of claim 6 wherein said third frame member comprises a transverse portion and parallel side portions, said transverse portion being adapted to rest upon the ground in said seat mode of use.

8. The device of claim 7 wherein limiting means extend between the side portions of said second and third frame members for limiting the extent of pivoted movement of said third frame member.

9. The device of claim 5 wherein, in said seat mode of use, the lower extremities of said second frame member are adapted to rest upon the ground adjacent a tree, and said tree-engaging strap means secures the device such that said second frame member is in a substantially vertical position while said seating panel is disposed in a substantially horizontal position.

10. The device of claim 9 wherein the portion of the device that faces the tree is considered to be the front extremity, and the oppositely facing portion is considered to be the rear extremity.

11. The device of claim 10 wherein the side portions of said second frame member are rearwardly bent adjacent their lower extremities.

12. The device of claim 11 constructed in a manner such that, when said shoulder strap loops are enlarged, the bottom extremity of said enclosure is able to swing rearwardly away from the side portions of said first frame member, causing the enclosure to be pendently supported by the transverse portion of said first frame member.

13. The device of claim 1 wherein said enclosure is removably attached to said first frame member.

* * * * *